3,206,321
"LONG POT-LIFE" SOYA FLOUR/CS₂ GLUE SUBSTANTIALLY FREE OF CARBON BISULFIDE THICKENING
Glenn Davidson, Aurora, Ill.; Edna D. Davidson, executrix of said Glenn Davidson, deceased, assignor to Edna D. Davidson, Aurora, Ill.
No Drawing. Filed Oct. 30, 1963, Ser. No. 320,002
5 Claims. (Cl. 106—154)

This application is a continuation-in-part as to common subject matter, of copending application Serial #134,123 filed August 28, 1961, which is a continuation in part of Ser. #813,330 filed May 15, 1959, which in turn is a continuation in part of Ser. #673,179 filed July 22, 1957, which in turn is a continuation in part of Ser. #430,739 filed May 18, 1954, all of which are now abandoned.

This invention relates to a method of formulating soya flour/$CS_2$ glues in a manner which avoids excessive carbon bisulfide thickening and the alkaline hydrolysis which has been used in the prior art to counteract carbon bisulfide thickening.

The result is a soya flour/$CS_2$ glue possessing a useful "plot-life" many times that of any prior art soya flour/$CS_2$ glue.

First, specifically I have discovered that if a soya flour/$CS_2$ glue is dispersed with an alkaline earth hydroxide, commonly commercially calcium hydroxide in the absence of hydroxides of the alkali metals, carbon bisulfide thickening is either nearly totally avoided or reduced to a negligible level, as long as the temperature is held below about 100° F.

The following preferred composition has remained at substantially constant viscosity and retained its full bonding strength as measured by laminating "chip-board" to form "solid fiber" stock for use in paper cartons, in excess of two weeks.

| | Parts |
|---|---|
| Water (70° F.) | 650 |
| Calcium carbonate (extender) | 100 |
| Soya flour (54% protein) | 200 |
| $CS_2$ | 2½ |
| Calcium hydroxide | 10 |

All parts by weight. Ingredients combined in the order listed under power agitation. The agitation continued for one hour after the addition of the last ingredient. Temperature maintained below about 100° F.

Second, I have discovered that the hydroxides of the alkali metals may be incorporated into the above composition without greatly changing its general characteristics beneficially or otherwise provided the amount of such alkali metal hydroxides does not exceed the equivalent of 3.70 parts sodium hydroxide per 100 parts of protein contained in the soya flour and still provide a minium of 12 hours useful pot life with some margin of safety.

This corresponds to approximately 2.0 parts sodium hydroxide per 100 parts soya flour containing 54% protein, and to approximately 1.665 parts sodium hydroxide per 100 parts of soya flour containing 45% protein.

The maximum of 3.70 parts sodium hydroxide applies irrespective of whether the sodium hydroxide results from the addition of caustic soda or is double decomposition sodium hydroxide or a combination of the two.

By double decomposition sodium hydroxide is meant the sodium hydroxide that results from the interaction of calcium hydroxide and a sodium salt capable of producing an insoluable calcium salt.

To illustrate: The sodium silicate mentioned in the prior are patents refers to Philadelphia Quartz "N" Brand sodium silicate or its commercial equivalent (see line 13, col. 3, Golick #2,612,455).

According to the manufacturer's specification "N" Brand sodium silicate contains 8.9% $Na_2O$. This is converted to NaOH by multiplying by 80/62. Thus, in the presence of calcium hydroxide, each 10 parts of sodium silicate yields approximately 1.15 parts of double decomposition sodium hydroxide. Similarly, 10 parts sodium carbonate ($Na_2CO_3$) yield approximately 7.5 parts NaOH and 10 parts trisodium phosphate ($Na_3PO_4 \cdot 12H_2O$) yield approximately 3.16 parts NaOH.

The question arises as to how great an extension of the conventional 4 hr. pot life is required to be useful in a practical sense. If the laminating plant is operating 3 eight hour shifts, then the 4 hr. pot life is reasonably adequate except perhaps at week ends.

If the plant is operating only two 8 hr. shifts in each 24 hrs., then a pot life of about 12 hrs. make it possible to use glue prepared near the end of the second shift on one day, during the first shift of the next day.

In the case of a plant operating only one 8 hr. shift, a pot life of 20–24 hrs. would make it possible to hold prepared glue from one day to the next.

In order to hold prepared glue over a week end, a pot life of the order of 70 hrs. is needed.

The practical upper limit for calcium hydroxide is about 100 parts calcium hydroxide per 100 parts soya flour protein, This upper limit is set by the fact that all commercial calcium hydroxide is more or less abrasive. All commercial laminated assemblies have to be trimmed or otherwise machined by means of saws, disc cutters, die cutters, clippers and the like. At calcium hydroxide contents in the glue in excess of about 100 parts calcium hydroxide per 100 parts soya flour protein (i.e. about 50 parts calcium hydroxide per 100 parts soya flour) the abrasive action on cutting tools becomes prohibitive.

In the case where alkali metal hydroxides are omitted the minimum calcium hydroxide required is in the range of 7 to 9-9½ parts per 100 parts of protein contained in the soya flour. The former amount is applicable only in isolated cases where neither near maximum water resistance nor pot life is required.

Alkali metal hydroxides may be used to replace a part of the minimum calcium hydroxide required, provided the total amount of such hydroxides does not exceed the above specified maximum of the equivalent of 3.70 parts sodium hydroxide per 100 parts of protein contained in the soya flour.

To illustrate: Since sodium and calcium hydroxides are approximately molecularly equivalent, sodium hydroxide may be substituted gram of gram for calcium hydroxide. In the extreme case, the minimum total hydroxide of 7 parts per 100 parts of the protein contained in the soya flour may be made up of 3.70 parts of sodium hydroxide plus 3.30 parts calcium hydroxide. It is to be noted that this extreme case does not represent the optimum but only a formulation that can be used in isolated cases.

By isolated cases is meant, in part, the cases where the water resistance requirements are not extremely severe. Due to the minimal 3.30 parts per 100 parts soya flour protein proportion of calcium hydroxide, the water resistance might be considered to be marginal by some users for some purposes.

Also, in the presence of even small amounts of NaOH, slow carbon bisulfide thickening occurs. The rate of this thickening is somewhat dependent upon the room temperature at which the prepared glue is held, assuming no artificial cooling of the glue. At room temperatures of 90–100° F., the thickening rate is faster than at a room temperature of 70° F.

All factors including simplicity considered the optimum is represented in the case where the alkali metal hydroxides are omitted and an alkaline earth hydroxide content equivalent to 9–9.5 parts calcium hydroxide per 100 parts of protein contained in the soya flour is used.

In other words, alkali metal hydroxides are permissible up to a point, but in no sense are they essential ingredients of my new long "pot-life" glue.

Magnesium, barium and strontium hydroxides are equivalents of calcium hydroxide on a molecular basis.

The amounts of carbon bisulfide required range from about 0.5 to 12.0 parts by weight per 100 parts protein contained in the soya flour.

So-called "inert extenders" may be used, including clay, barytes, calcium carbonate, calcium sulfate, plaster of Paris, asphalt, emulsions of asphalt, or various resins, rubber latex, etc; in amounts sometimes as large as several times the weight of the soya flour.

The following table illustrates a number of formulations in which the present invention may be used.

"Water-resistant" as used herein means: Compliance with Joint Army-Navy Specification "Jan–P–108."

I claim:
1. A water-resistant adhesive, fluid at below 100° F., having a usable pot life of at least 12 hours, said adhesive consisting essentially of soya flour, water, carbon bisulfide in an amount ranging from 0.5 to 12 parts by weight for each 100 parts of soya flour protein, and an agent selected from the group consisting of (1) an alkaline earth metal hydroxide of from 7 to 100 parts by weight per 100 parts of soya flour protein and (2) a mixture of alkaline earth metal hydroxide and alkali metal hydroxide of from 7 to 100 parts by weight per 100 parts of soya flour protein wherein the maximum alkali metal hydroxide content is 3.70 parts by weight per 100 parts of soya flour protein.

2. An adhesive according to claim 1 wherein said agent (1) is an alkaline earth metal hydroxide in an amount from 9 to 22 parts by weight per 100 parts of soya flour protein.

3. An adhesive according to claim 2 in which said agent consists of calcium hydroxide.

4. An adhesive according to claim 1 in which said agent (2) consists of a mixture of calcium hydroxide and sodium hydroxide.

5. An adhesive according to claim 1 additionally containing an extender.

Table

| Example Number | All parts by weight | | | | | | | | |
|---|---|---|---|---|---|---|---|---|---|
| | Water | Soya Flour (approx. 54% protein) | Calcium Hydroxide | Water | Carbon Bisulfide | Asphalt | Calcium Carbonate or Clay or Barytes | Sodium Hydroxide | Latex e.g. Dow 512-K |
| 1 | 300 | 100 | 12 | 25 | 1 | | | | |
| 2 | 300 | 100 | 12 | 25 | 12 | | | | |
| 3 | 300 | 100 | 5 | 25 | 1 | | | | |
| 4 | 300 | 100 | 50 | 35 | 1 | | | | |
| 5 | 300 | 100 | 12 | 25 | 1 | 10 | | | |
| 6 | 300 | 100 | 12 | 125 | 1 | 500 | | | |
| 7 | 300 | 100 | 12 | 40 | 1 | 100 | | | |
| 8 | 300 | 100 | 12 | 25 | 1 | | 10 | | |
| 9 | 300 | 100 | 12 | 65 | 1 | | 100 | | |
| 10 | 300 | 100 | 12 | 225 | 1 | | 500 | | |
| 11 | 300 | 100 | 12 | 25 | 1 | | | a 2 | |
| 12 | 300 | 100 | 50 | 35 | 1 | | | a 2 | |
| 13 | 300 | 100 | 2 | 25 | 1 | | | a 2 | |
| 14 | 300 | 100 | 12 | 25 | 1 | | | | 100 | a These amounts of NaOH correspond to 3.70 parts per 100 parts soya flour protein on a soya flour containing 54% protein. If a soya flour of lower protein content is used these amounts must be correspondingly reduced. For example, soya flour containing 45% protein permits only 1.665 NaOH per 100 parts soya flour as a maximum.

References Cited by the Examiner

UNITED STATES PATENTS

| | | | |
|---|---|---|---|
| 1,950,060 | 3/34 | Osgood | 106—154 |
| 2,150,175 | 3/39 | Laucks et al. | 106—154 |
| 2,597,006 | 5/52 | Koenig et al. | 106—154 |
| 2,612,455 | 9/52 | Golick | 106—154 |

ALFRED L. LEAVITT, *Primary Examiner.*

MORRIS LIEBMAN, ALEXANDER H. BRODMERKEL, *Examiners.*